United States Patent [19]

Rosán, Jr.

[11] Patent Number: 4,534,101
[45] Date of Patent: Aug. 13, 1985

[54] METHOD OF INSTALLING SELF-LOCKING NUT AND BOLT ASSEMBLY

[75] Inventor: José Rosán, Jr., Newport Beach, Calif.

[73] Assignee: Rexnord Inc., Brookfield, Wis.

[21] Appl. No.: 343,376

[22] Filed: Jan. 27, 1982

[51] Int. Cl.³ ............................................. B23P 11/00
[52] U.S. Cl. ........................................ 29/432; 29/258; 29/259; 29/426.6; 29/453; 29/813; 411/109; 411/120
[58] Field of Search ................... 29/926.5, 926.6, 428, 29/235, 432, 240, 453, 256, 258, 259, 813; 411/109, 108, 103, 105, 119, 120

[56] References Cited

U.S. PATENT DOCUMENTS

| | | | |
|---|---|---|---|
| 1,082,397 | 12/1913 | Blass | 339/84 |
| 1,733,039 | 10/1929 | Weston | 339/86 |
| 2,577,810 | 12/1951 | Rosan | 411/109 |
| 2,754,882 | 7/1956 | Rosan | 411/109 X |
| 2,788,830 | 4/1957 | Rosan | 29/432 X |
| 2,886,090 | 5/1959 | Rosan | 411/109 |
| 3,054,436 | 9/1962 | Rosan | 411/109 |
| 3,259,161 | 7/1966 | Rosan | 29/432 X |
| 3,259,162 | 7/1966 | Rosan | 29/432 X |
| 3,280,874 | 10/1966 | Rosan | 29/432 X |
| 3,339,436 | 9/1967 | Rosan | 29/240 X |
| 3,630,252 | 12/1971 | Rosan, Sr. | 10/27 R X |
| 4,093,333 | 6/1978 | Tjornhom, Sr. | 339/78 |

Primary Examiner—Mark Rosenbaum
Assistant Examiner—Carl J. Arbes

[57] ABSTRACT

A method for installing a locking nut or bolt includes drilling a bore having at least two diameters in a surface of an element so as to accommodate a fastener assembly having a threaded shaft and a group of elements including a cylinder a locking ring, two retaining rings and a conical spring, serrating an area of the bore having the layer diameter, screwing the fastener assembly into the bore, applying a torque to the group of elements while suppressing the locking ring thereby engaging the locking ring into the serrated area of the bore, retracting an outer sleeve of the tool and tightening the group of elements.

1 Claim, 6 Drawing Figures

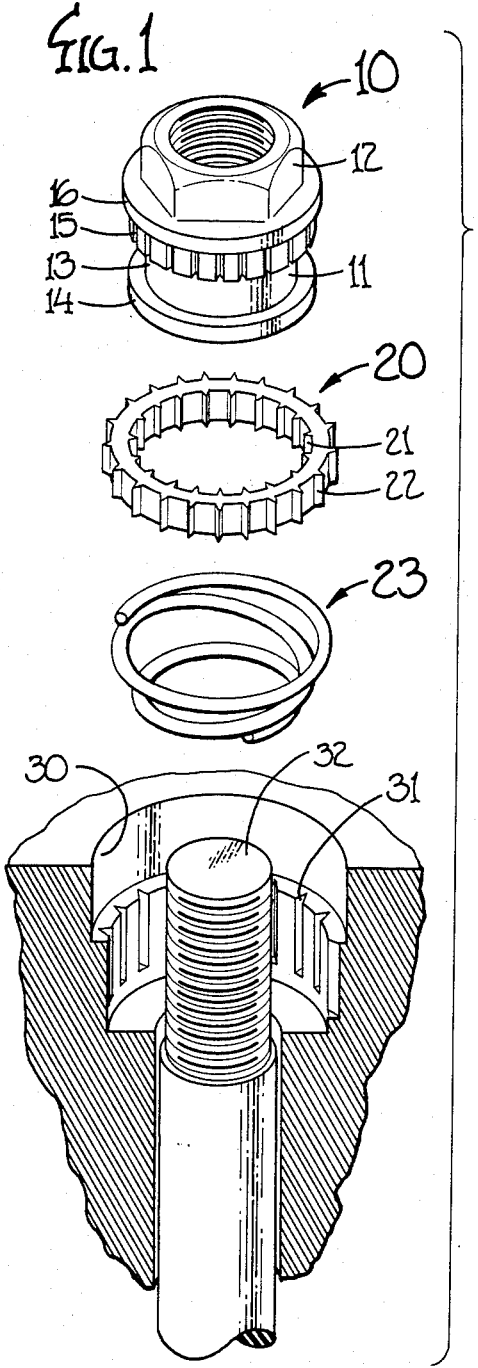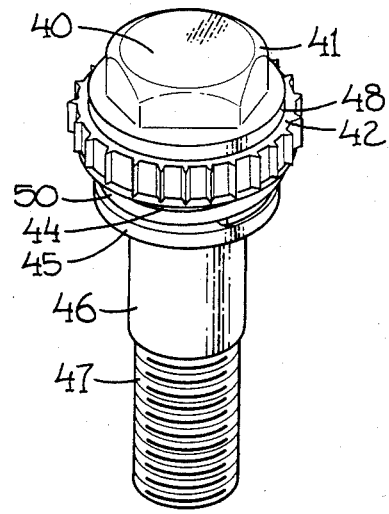

4,534,101

METHOD OF INSTALLING SELF-LOCKING NUT AND BOLT ASSEMBLY

BACKGROUND OF THE INVENTION

1. Field of the Invention

This invention relates generally to a method of installing fasteners and more specifically to a self-locking nut or bolt designed to accommodate a locking ring for anchoring bodies subject to vibration or shock.

2. Description of the Prior Art

A patent search was conducted that disclosed the following U.S. Pat. Nos. 2,407,904; 3,214,183; 3,054,436; 3,259,162.

With the wide use of jet engines, helicopters, rockets and turbine mechanisms that routinely vibrate or receive shocks, the problem of securing various components has become acute, particularly in the aircraft, space and electric generating fields where tolerances are rigid and any loosening can mean failure of expensive equipment. The invention contemplates certain special cases in aircraft and turbine construction, where all fastening is subject to constant vibrating action, assurance must be provided that the parts will not loosen, or rotation of the fastening device occur be it nut or bolt; that the nut or bolt be flush with the surface and that the nut or bolt may be easily removed.

In the industry the use of lock rings has often been limited to the use of softer materials for the workpiece and harder materials for the lock ring. This has been required so that the serrations of the lock ring could bite into the workpiece and insure a lock by having the outer serration embedded in the workpiece while the inner serrations prevent the bolt or nut from rotating. This system requires, during the replacement of an installed lock ring, that the new lock ring have the same spacing in the serrations as the ring being displaced so that the new part can fit in the same serrations, for the creation of new serrations by forcing in a new ring with different spacing in the serrations might lead to a wider serration and to some loosening of the object attached.

SUMMARY OF THE INVENTION

Seeking to avoid these problems and meet the industrial requirements the instant invention has as its object the method of installing and withdrawing a lock ring assembly in harder or just as hard material by pre-serrating the bore in the workpiece to accommodate the nut or bolt assembly without protruding above the surface.

Another object is to require the pre-serrated bore to accommodate a lock ring with variable serrations with at least three opposed serrations engaging the serrations in the bore so as to prevent rotation of the fastening device.

Still another object of the invention includes the retention of the spring and lock ring on the nut or bolt so as to obviate the necessity of assembling component parts at the point of final assembly prior to fastening objects together. This is accomplished by forming the nut or bolt head with a top rim greater in diameter and above the serrations.

A further object of the invention is to provide a nut or bolt assembly that can be easily removed to repair or replace the fastened parts.

It is still a further object of this invention to provide a flush fastening device for assembled parts by counterboring a hole for the head of the nut or bolt in the workpiece.

These and other objects and advantages of the invention, as well as the details of the illustrative embodiments, will be more fully understood from the following drawings and description.

DESCRIPTION OF THE DRAWINGS

FIG. 1 is a plan view of the nut assembly and workpiece bore.

FIG. 2 is a plan view of another embodiment with the invention incorporated on a bolt with the workpiece bore.

DESCRIPTION OF THE PREFERRED EMBODIMENT

Figure 3:
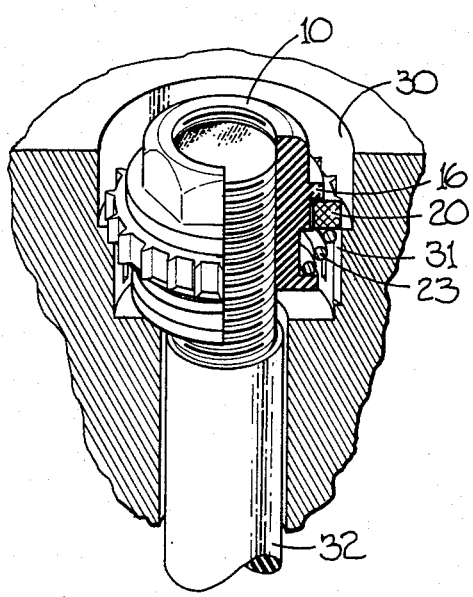
FIG. 3 is a partly cutaway side view of the nut on a stud with the lock ring touching the serrations of the bore.
Figure 4:
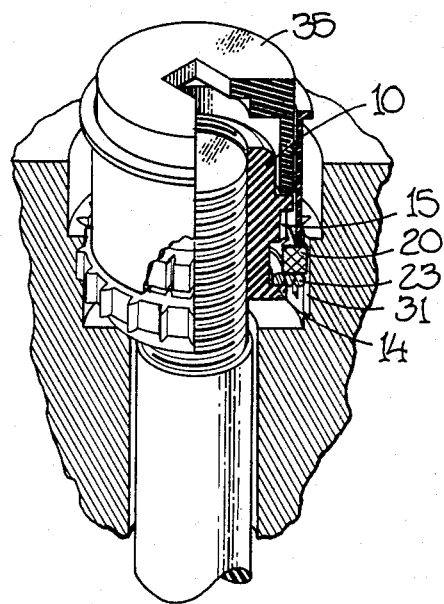
FIG. 4 is partially sectioned side view of the invention with the installation tool pressing the lock ring against the spring and away from serrations on the nut and down into the serration of the bore.

FIG. 1 illustrates all the features of the self-locking nut 10 of this invention. The invention is composed of a cylinder 11, a hexagonal or other shaped head 12, an annular groove 13, the bottom of the cylinder is shaped into a retaining ring 14. Just above the annular groove 13 is a serrated portion 15. Above the serration the nut or bolt head is formed into a blocking ring 16 greater in diameter than the serrations on the nut. Loosely attached to said serrated portion 15 is a lock ring 20 with serrations inside 21 and outside 22. The lock ring 20 in normal position is in loose engagement with the serrations on the nut. Below the lock ring 20 is a conical spring 23, located within the annular groove 13 in the center of the spring 23 with the larger portion of the spring 23 facing the lock ring 20. Above the lock ring 20 the nut or bolt head is formed into a rim 16 that traps the lock ring 20 and spring 23 between the retaining ring 14 and the rim 16.

Figure 5:
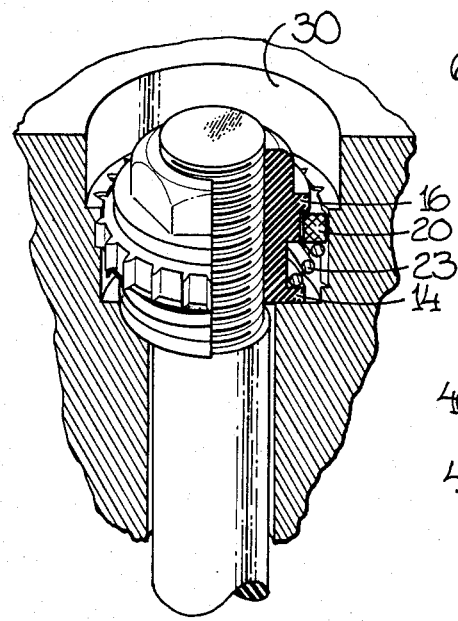
FIG. 5 is a partially sectioned view of the nut after installation with the spring fully expanded.
Figure 6:
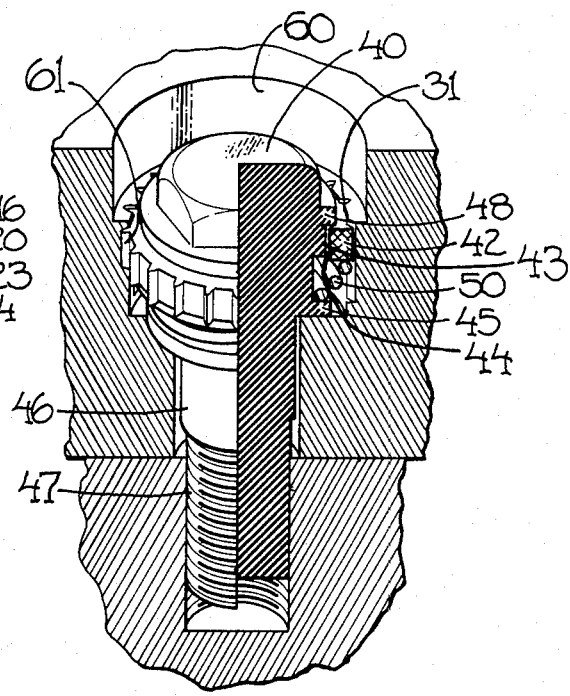
FIG. 6 is a partially sectioned view of the bolt of this invention after installation with the spring extended.

In the workpiece a bore is drilled to accommodate the nut assembly flush with the surface when installed (see FIG. 5). The sides of the bore are serrated 31 in an area calculated to accommodate the external serrations 22 of the lock ring 20 when its internal serrations 21 are engaged with the serrations 15 of the nut after installation. (The spring 23 is fully extended having pushed the lock ring 20 into locking engagement with the bore serrations 31 and the nut serrations 15.) See FIG. 5.

FIG. 2 is a view of another embodiment of this invention in which a bolt 40 with a hexagonal or other head 41, and a rim 48 with a diameter just beyond the crest of the serrations 43, has a lock ring 42 in engagement with a serrated portion 43 of the bolt. Immediately below the serrated portion 43 is an annular groove 44. [This annular groove 44 is the center of a conical spring 50 with the larger portion facing the lock ring 42.] [The spring 50 is fully extended when the lock ring 42 engages the serrations 43 of the bolt and the serrated portion of the bore 31.] Immediately below the annular groove 44 of the bolt a retaining ring 45 is formed. This is followed by a plain portion 46 followed by a threaded portion 47. The plain portion 46 may be eliminated or minimized.

In use a bore 30 is drilled in the surface of the workpiece to accommodate the nut assembly flush with the surface. A portion of the bore 30 is serrated 31. At the nut or bolt assembly station a lock ring 20 is assembled on the nut 10, its upper edge being stopped from slipping off the nut by rim 16. Next is assembled a conical spring 23 with the large diameter toward the lock ring 20 goes over the retaining ring 14 and the spring snaps in place trapping the spring 23 and the lock ring 20 in the center of the assembly. This completed assembly is then installed in the bore 30. The nut is turned on the stud or bolt until the lock ring 20 just touches the serrated portion on the bore 30 and aligns itself with the preformed serration 31. A special installation tool 35 is then engaged on nut 10, the ends of the tool 35 engage the lock ring 20, compressing the spring 23 against retaining ring 14 and mating the external serrations 21 into the preformed bore serrations 31. The nut 10 is then torqued until the low limit of installation torque is reached. The ends of tool 35 are then retracted and the nut 10 is continually turned until a click is heard which is the lock ring 20 being forced into locking engagement with the serrated portion 15 of the nut and the serrated portion 31 of the bore by the action of the spring 23. The nut 10 is now locked. Unlocking is the reverse. The tool is inserted forcing the lock ring 20 to compress spring 23 until the lock ring is disengaged from the nut 10. The nut is then loosened and withdrawn.

In another embodiment of the invention a bolt 40 is assembled at the assembly station with the lock ring 42 assembled on the bolt 40 against rim 48, conical spring 50 is next assembled over retaining ring 45 with the wide portion of the conical spring 50 resting against lock ring 42 and the narrow edge engaging ring 45. The method of installation involves placing the bolt assembly 40 into bore 60, the top of which has a serrated bore 61 which can accommodate the lock ring 42. The bolt assembly 40 is tightened until the lock ring 42 rests upon the threaded portion of the bore 61. An installation tool 35 then engages the bolt 40 and depresses the lock ring 42 and putting spring 50 under tension mating the lock ring serrations 43 with the serrations of 61. The bolt 40 is then tightened to the lower torque limit. The sleeve of the tool is then retracted and the bolt 40 tightened further until a click is heard which is the lock ring 42 being forced by spring 50 into engagement with the serrated portion of the bolt 44 and the serrated portion of the bore 61. The bolt 40 is now completely installed. Retraction of the bolt is the reverse. The tool 35 is inserted, disengaging lock ring 42 and compressing ring 50. The bolt 40 is then loosened and withdrawn.

A plain portion 46 and a threaded portion 47 complete the design. In practice the plain portion 46 may be omitted.

While several embodiments of the invention, their method of use and tools for the installation of same have been described, it is, of course, understood that the particular embodiments of the inventions disclosed are for illustrative purposes only and that various changes may be made herein without departing from the spirit of the invention or the scope of the annexed claims.

I claim:

1. A method of securing at least two elements together with a fastener so as to resist separation by vibration and shock which comprises the steps of:

drilling a bore in one element to accommodate a fastener assembly at least flush with the outer surface of the outermost element, said fastener assembly comprising a threaded shaft and a driven portion having a transverse dimension greater than that of said threaded shaft, said driven portion including a longitudinal cylinder, a first retaining ring at one end of said cylinder, a second retaining ring at the opposite end of said cylinder, a serrated portion adjacent said second retaining ring, a locking ring having inside and outside serration and longitudinally slidable along said driven portion from said first retaining ring to said second retaining ring, and a conical spring with the larger diameter adjacent said lock ring and the smaller diameter adjacent said first retaining ring;

serrating an area generally between one-quarter to one-half way up said bore;

screwing said fastener assembly into said bore;

engaging said driven portion with a tool means for suppressing said lock ring onto said spring which goes into compression, and engaging the lock ring into the serrated area of the bore;

torquing said driven portion to its lower limit; and retracting an outer sleeve of said tool means and tightening said driven portion until said conical spring pushes said lock ring into a locking engagement with said serrated portion of said driven portion and the serrated area of said bore.

* * * * *